(12) United States Patent
Shastri et al.

(10) Patent No.: US 7,756,981 B2
(45) Date of Patent: Jul. 13, 2010

(54) SYSTEMS AND METHODS FOR REMOTE ROGUE PROTOCOL ENFORCEMENT

(75) Inventors: Vijnan Shastri, Encinitas, CA (US); Lisa Lee, Truckee, CA (US); Trung Tran, San Diego, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 494 days.

(21) Appl. No.: 11/556,470

(22) Filed: Nov. 3, 2006

(65) Prior Publication Data

US 2007/0112957 A1 May 17, 2007

Related U.S. Application Data

(60) Provisional application No. 60/732,988, filed on Nov. 3, 2005.

(51) Int. Cl.
*G06F 15/16* (2006.01)
(52) U.S. Cl. .......................... 709/227; 709/203; 709/223
(58) Field of Classification Search ......... 709/227–229, 709/223–226
See application file for complete search history.

(56) References Cited

U.S. PATENT DOCUMENTS

| | | |
|---|---|---|
| 4,425,618 A | 1/1984 | Bishop et al. |
| 5,161,192 A | 11/1992 | Carter et al. |
| 5,249,292 A | 9/1993 | Chiappa |
| 5,339,430 A | 8/1994 | Lundin et al. |
| 5,421,017 A | 5/1995 | Scholz et al. |
| 5,761,415 A | 6/1998 | Joseph et al. |
| 5,907,678 A | 5/1999 | Housel, III et al. |
| 5,968,176 A | 10/1999 | Nessett et al. |
| 5,983,270 A | 11/1999 | Abraham et al. |
| 6,081,900 A | 6/2000 | Subramaniam et al. |

(Continued)

FOREIGN PATENT DOCUMENTS

DE 198 10 802 9/1999

OTHER PUBLICATIONS

"Protecting the Enterprise from Rogue Protocols" Akonix Systems, Inc., 2002. [online] Apr. 1, 2005 http://www.stelzner.com/PDF/Akonix-L7.pdf.*

(Continued)

*Primary Examiner*—Joseph E Avellino
*Assistant Examiner*—Jackie Zuniga
(74) *Attorney, Agent, or Firm*—Knobbe, Martens, Olson & Bear, LLP

(57) ABSTRACT

A user agent residing within a remote client and configured to enforce message protocol policy is disclosed. The user agent includes a communications monitoring element that examines a communications connection between the client and an external message server to determine if the message server matches a restricted server attribute. The user agent also includes a communications controller element that works with the communications monitoring element to block communications between the client and the message server when the message server matches a restricted server attribute unless the communications are monitored by a protocol inspection gateway. The gateway intercepts the communications between the client and the message server and inspects a message protocol associated with the intercepted communications to determine if the message protocol matches a protocol definition file, and when a match occurs, apply a policy enforcement rule that overrides aspects of the message protocol associated with the intercepted communications.

25 Claims, 3 Drawing Sheets

U.S. PATENT DOCUMENTS

| | | | |
|---|---|---|---|
| 6,128,298 | A | 10/2000 | Wootton et al. |
| 6,154,775 | A | 11/2000 | Coss et al. |
| 6,226,372 | B1 | 5/2001 | Beebe et al. |
| 6,317,837 | B1 | 11/2001 | Kenworthy |
| 6,321,337 | B1 | 11/2001 | Reshef et al. |
| 6,334,215 | B1 | 12/2001 | Barker et al. |
| 6,415,318 | B1 | 7/2002 | Aggarwal et al. |
| 6,513,013 | B1 | 1/2003 | Stephanou |
| 6,513,122 | B1 | 1/2003 | Magdych et al. |
| 6,519,703 | B1 | 2/2003 | Joyce |
| 6,557,037 | B1 | 4/2003 | Provino |
| 6,600,726 | B1 | 7/2003 | Nevo et al. |
| 6,631,363 | B1 | 10/2003 | Brown et al. |
| 6,683,954 | B1 | 1/2004 | Searle |
| 6,715,084 | B2 | 3/2004 | Aaron et al. |
| 6,721,890 | B1 | 4/2004 | Shrikhande |
| 6,751,562 | B1 | 6/2004 | Blackett et al. |
| 6,757,732 | B1 | 6/2004 | Sollee et al. |
| 6,775,284 | B1 | 8/2004 | Calvignac et al. |
| 6,781,990 | B1 | 8/2004 | Puri et al. |
| 6,853,851 | B1 | 2/2005 | Rautiola et al. |
| 6,873,988 | B2 | 3/2005 | Herrmann et al. |
| 6,941,349 | B2 | 9/2005 | Godfrey |
| 6,944,555 | B2 | 9/2005 | Blackett et al. |
| 6,963,858 | B2 | 11/2005 | Wang et al. |
| 6,983,370 | B2 | 1/2006 | Eaton et al. |
| 7,013,326 | B1 | 3/2006 | Suzuki et al. |
| 7,068,769 | B1 | 6/2006 | Weaver et al. |
| 7,076,650 | B1 | 7/2006 | Sonnenberg |
| 7,111,044 | B2 | 9/2006 | Lee |
| 7,131,003 | B2 | 10/2006 | Lord et al. |
| 7,143,439 | B2 | 11/2006 | Cooper et al. |
| 7,159,109 | B2 | 1/2007 | Egevang |
| 7,191,213 | B1 | 3/2007 | Bouchard et al. |
| 7,200,634 | B2 | 4/2007 | Mendiola et al. |
| 7,206,841 | B2 | 4/2007 | Traversat et al. |
| 7,209,957 | B2 | 4/2007 | Patron et al. |
| 7,225,226 | B2 | 5/2007 | Fitzpatrick et al. |
| 7,248,978 | B2 | 7/2007 | Ransom |
| 7,266,585 | B2 | 9/2007 | Kay et al. |
| 7,266,594 | B2 | 9/2007 | Kumbalimutt et al. |
| 7,284,034 | B2 | 10/2007 | Matsa et al. |
| 7,302,574 | B2 | 11/2007 | Conwell et al. |
| 7,321,969 | B2 | 1/2008 | Schoen et al. |
| 7,401,054 | B1 | 7/2008 | Shah et al. |
| 7,401,152 | B2 | 7/2008 | Traversat et al. |
| 7,401,158 | B2 | 7/2008 | Beauchamp et al. |
| 7,412,490 | B2 | 8/2008 | Matsa et al. |
| 7,428,590 | B2 | 9/2008 | Miller et al. |
| 7,437,442 | B2 | 10/2008 | Ashiya |
| 7,483,982 | B2 | 1/2009 | Hegli et al. |
| 2002/0064149 | A1 | 5/2002 | Elliott et al. |
| 2002/0069200 | A1 | 6/2002 | Cooper et al. |
| 2002/0103931 | A1 | 8/2002 | Mott |
| 2002/0116643 | A1 | 8/2002 | Raanan et al. |
| 2002/0129088 | A1 | 9/2002 | Zhou et al. |
| 2002/0141378 | A1 | 10/2002 | Bays et al. |
| 2002/0178227 | A1 | 11/2002 | Matsa et al. |
| 2002/0178231 | A1 | 11/2002 | Matsa et al. |
| 2002/0198949 | A1 | 12/2002 | Maehiro |
| 2003/0018726 | A1 | 1/2003 | Low et al. |
| 2003/0055982 | A1 | 3/2003 | Noro et al. |
| 2003/0055994 | A1 | 3/2003 | Herrmann et al. |
| 2003/0074410 | A1 | 4/2003 | Kay et al. |
| 2003/0101343 | A1 | 5/2003 | Eaton et al. |
| 2003/0131061 | A1 | 7/2003 | Newton et al. |
| 2003/0145226 | A1 | 7/2003 | Bruton, III et al. |
| 2003/0154399 | A1 | 8/2003 | Zuk et al. |
| 2003/0204722 | A1 | 10/2003 | Schoen et al. |
| 2003/0204741 | A1 | 10/2003 | Schoen et al. |
| 2003/0208545 | A1 | 11/2003 | Eaton et al. |
| 2004/0039827 | A1 | 2/2004 | Thomas et al. |
| 2004/0088423 | A1* | 5/2004 | Miller et al. ............... 709/229 |
| 2004/0103318 | A1 | 5/2004 | Miller et al. |
| 2004/0109518 | A1 | 6/2004 | Miller et al. |
| 2004/0111623 | A1 | 6/2004 | Miller et al. |
| 2004/0117501 | A1 | 6/2004 | Day et al. |
| 2004/0136386 | A1 | 7/2004 | Miller et al. |
| 2004/0162724 | A1 | 8/2004 | Hill et al. |
| 2004/0230684 | A1 | 11/2004 | Smolinski |
| 2004/0254998 | A1 | 12/2004 | Horvitz |
| 2005/0149630 | A1 | 7/2005 | Smolinski et al. |
| 2006/0031365 | A1 | 2/2006 | Kay et al. |
| 2006/0064469 | A1 | 3/2006 | Balasubrahmaniyan et al. |
| 2007/0088834 | A1* | 4/2007 | Litovski et al. ............ 709/227 |
| 2007/0124577 | A1 | 5/2007 | Nielsen et al. |
| 2008/0196099 | A1 | 8/2008 | Shastri |
| 2008/0256257 | A1 | 10/2008 | Miller et al. |

OTHER PUBLICATIONS

FreeNews.com. "Akonix Launches First Instant Messaging Security Solution for Remote Users; L7 Remote User Agent Ensures I'm Use by Mobile Employees Meets Corporate Compliance and Security Needs" [online] Oct. 11, 2005 [retrieved on Aug. 12, 2007] Retrieved from the Internet <URL: http://www.freshnews.com/news/computers-internet/article_27348.html?Akonix>.
PCT Search Report for PCT/US06/60526 mailed Mar. 27, 2008.
International Search Report for related PCT International Application No. PCT/US04/04837, filed Feb. 14, 2004 dated Oct. 2, 2007.
International Search Report for related PCT International Application No. PCT/US04/029848, dated Nov. 17, 2008.
International Search Report for related PCT International Application No. PCT/US05/44089, dated Jan. 17, 2007.
International Search Report Related to PCT/US03/18311.
U.S. Appl. No. 10/167,229, filed Jun. 10, 2002, Poling et al.

* cited by examiner

SYSTEMS AND METHODS FOR REMOTE ROGUE PROTOCOL ENFORCEMENT

APPLICATIONS FOR CLAIM OF PRIORITY

This application claims the benefit of U.S. Provisional Application No. 60/732,988 filed Nov. 3, 2005. The disclosure of the above-identified application is incorporated herein by reference.

CROSS REFERENCE TO RELATED APPLICATIONS

This application is related to U.S. patent application Ser. No. 10/167,228, entitled "Extensible Gateway for Protection against Rogue Protocols," filed Jun. 10, 2002, U.S. patent application Ser. No. 10/459,408, entitled "Extendible Gateway for Protection Against Rogue Protocols," filed Jun. 10, 2003, and U.S. patent application Ser. No. 10/459,111, entitled "Extendible Gateway for Protection Against Rogue Protocols," filed Jun. 10, 2003, each incorporated herein by reference as if set forth in full.

BACKGROUND

1. Field of the Invention

The embodiments disclosed in this application generally relate to protection against rogue protocols, such as for example Instant Message (IM) protocols, and the like.

2. Background of the Invention

When a portable computing device communicates remotely with a public server through the Internet directly or through an enterprise network connection, both the computing device and the enterprise network becomes vulnerable to attempts at intrusion by malicious users. Intrusion might occur by a person seeking to wrongfully access the portable computing device or the enterprise network, or might be due to a program (i.e., virus) attempting to wrongfully access resources available on the portable computing device or the enterprise network. For example, a computer virus might be sent from a public server and if allowed to operate on the portable computing device, can commandeer resources on the portable computing device or the enterprise network when the portable computer is logged on. For another example, a malicious user can generate a set of messages in an attempt to deny service to, or otherwise have an effect on the portable computing device or the enterprise network, such as preventing access by the portable computing device to resources on the enterprise network, or by preventing access by others to that portable computing device.

It is therefore sometimes desirable to apply policy rules for handling the message traffic of a portable computing device, particularly when those messages use a message protocol that might not be directed to business aspects of the network. For example, a number of message protocols have been developed recently that are primarily for personal use, but which often make their way into proprietary networks, such as enterprise networks, and which are subjected to possible abuses. These message protocols include, for example, instant message (IM) protocols, peer-to-peer (P2P) and other file sharing protocols, interactive game protocols, distributed computing protocols, HTTP Tunneling, and ".NET" or "SOAP" methods of computer program interaction. Some of the possible abuses that can result from these message protocols entering the enterprise network include accidental delivery of a computer virus to a client device within the enterprise network, communication of sensitive or proprietary information between a portable computing device outside the enterprise network and a client device on the enterprise network.

In a conventional situation, client devices on the enterprise network, and behind the enterprise network's firewall generate various communications with external devices (i.e., message servers, home personal computers, etc.) using various communications protocols, such as IM. In certain embodiments described in the related applications referenced above, a protocol enforcement gateway residing on the enterprise network ensures that the appropriate protocol enforcement rules, or policies, such as security enforcement policies are enforced for all of the communications generated by the client devices with the external devices. When a client device is portable and accesses the enterprise network remotely, the protocol enforcement gateway maybe unable to control communication traffic generated by the user by ensuring enforcement of all communication protocol policies. For example, in a situation where the portable client device is operated in a remote location (i.e., café, airport, restaurant, etc.) that is external to the enterprise network, there is a need to enforce communication protocol policies for all non-business related communications generated by the portable client device.

SUMMARY

Methods and systems for ensuring enforcement of enterprise network protocol enforcement policies for portable computing devices are disclosed.

In one aspect, a user agent residing within a remote client and configured to enforce message protocol policy is disclosed. The user agent includes a communication monitoring element and a communication controller element. The communications monitoring element is configured to examine a communications connection between the remote client and an external message server to determine if the external message server matches a restricted server attribute. The communications controller element is configured to work in conjunction with the communications monitoring element to block communications between the remote client and the external message server, when the external message server matches the restricted server attribute unless the communications between the remote client and the external message server are monitored by a protocol inspection gateway.

The protocol inspection gateway is configured to intercept the communications between the remote client and the external message server and inspect a message protocol associated with the intercepted communications to determine if the message protocol matches a protocol definition file, and when a match occurs, apply a policy enforcement rule associated with the protocol definition file that overrides aspects of the message protocol associated with the intercepted communications.

In a different aspect, a system for enforcing message protocol policy for a remote client is disclosed. The system includes a virtual private network agent, a user agent and an enterprise network. The virtual private network agent resides within the remote client and is configured to function as a communications proxy for the remote client. The user agent resides within the remote client, the user agent is configured to examine every communications connection established between the remote client and an external message server to determine whether the external message server matches a restricted server attribute, and when a match occurs, blocking all messages transmitted between the remote client and the external message server unless the messages are routed through the virtual private network agent.

The enterprise network is communicatively connected to the remote client and the external message server. The external network includes a virtual private network gateway and a message protocol inspection gateway. The virtual private network is configured to be in communications with the virtual private network agent and to send and receive messages from the virtual private network via tunneling. The message inspection gateway is communicatively connected to the virtual private network gateway and the external message server.

The protocol inspection gateway is configured to intercept messages from the virtual private network gateway and the external message server and inspect a message protocol associated with the intercepted message to determine if the message protocol matches a protocol definition file, and when a match occurs, apply a policy enforcement rule associated with the protocol definition file that overrides aspects of the message protocol associated with the intercepted message.

In another aspect, a method for enforcing message protocol policy for a remote client is disclosed. A communications connection is established between the remote client and an external message server. The communication connection is inspected to determine if the external message server matches a restricted server attribute. When a match occurs, the communications connection is blocked unless all messages communicated via the connection are first intercepted by a protocol inspection gateway. The protocol inspection gateway is configured inspect a message protocol associated with the intercepted message to determine if the message protocol matches a protocol definition file, and when a match occurs, apply a policy enforcement rule associated with the protocol definition file that overrides aspects of the message protocol associated with the intercepted message.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which.

DETAILED DESCRIPTION

An invention is described for methods and systems for ensuring enforcement of enterprise network protocol enforcement policies for portable computing devices. It will be obvious, however, that the present invention may be practiced without some or all of these specific details. In other instances, well known process operations have not been described in detail in order not to unnecessarily obscure the present invention.

As used herein, an enterprise network can include one or more internal networks such as a local area network (LAN), wide area network (WAN), locally switched network, or publicly switched network, some other communication technique, or some combination thereof, by which devices locally coupled to the enterprise network can communicate with each other. A virtual private network (VPN) is private communications network often used within a company, or by several companies or organizations, to communicate confidentially over a publicly accessible network (e.g., Internet, etc.).

Most VPNs operate using the concept of "tunneling" which is the transmission of data through a public network in such a way that routing nodes in the public network are unaware that the transmission is part of a private network. Tunneling is generally done by encapsulating the private network data and protocol information within the public network protocol data so that the tunneled data is not available to anyone examining the transmitted data frames. Typically, the basic tunneling infrastructure nodes are a VPN client and a VPN gateway. The VPN client normally resides within the client computer while the VPN gateway is interfaced with the private network that the VPN client "tunnels" through the publicly accessible network to access.

It will be understood that the term remote device can refer to laptops, personal data assistants (PDAs), smartphones, handheld computers, or any other device that can be used to remotely access an enterprise network and generate communications. Furthermore, the term communications refers to any signal generated by a device carrying information intended to be received by another device. For example, this may include but is not limited to instant messaging (IM) communications, voice over Internet protocol (IP) communications, e-mail, etc.

Figure 1:
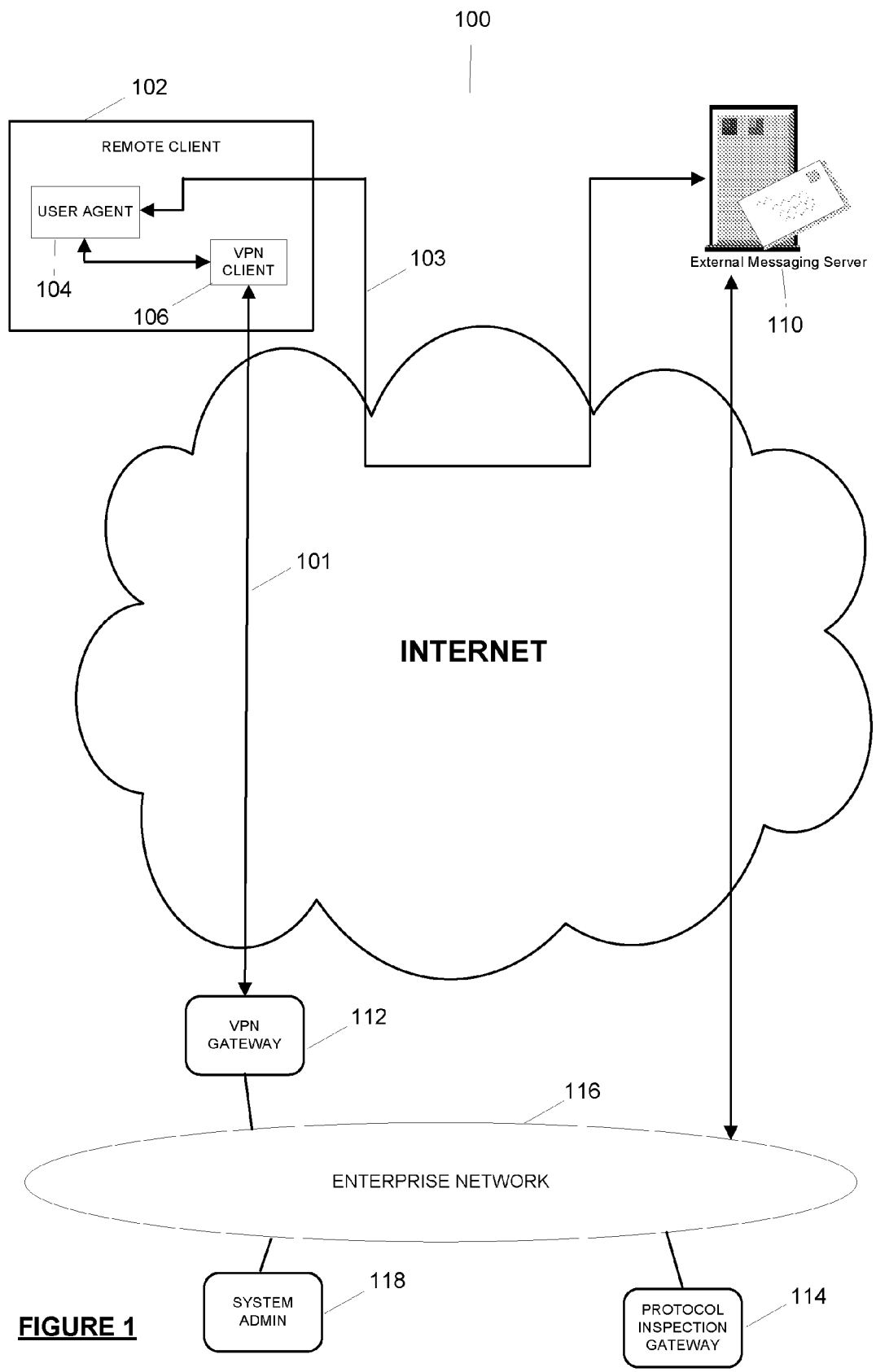
FIG. 1 is a block diagram illustration of a system for enforcing message protocol policy for a remote client, in accordance with one embodiment.

FIG. 1 is a block diagram illustration of a system for enforcing message protocol policy for a remote client, in accordance with one embodiment. As depicted herein, the system 100 includes a remote client 102, an external message server 110, a VPN gateway 112, a protocol inspection gateway 114, an enterprise network 116, and a system administrator console 118. The VPN gateway 112 and protocol inspection gateway 114 are both coupled to the enterprise network 116 and are communicatively connected to each other via the enterprise network 116. The VPN gateway 112 and protocol inspection gateway 114 can be embodied as a hardware device (e.g., server, router, etc.) or a software module depending on the requirements of the particular application. In one embodiment, the VPN gateway 112 and protocol inspection gateway 114 are each embodied in separate hardware devices. For example, the functionalities of the VPN gateway 112 can be embodied in a system router that is in communications with the VPN client 102, whereas the functionalities of the protocol inspection gateway 114 are embodied in a server that is coupled to the enterprise network 116. In another embodiment, the functionalities of the VPN gateway 112 and the protocol inspection gateway 116 are combined into one integrated network gateway device that is coupled to the enterprise network 116.

The remote client 102 hosts both a user agent 104 and a VPN client 106. In one embodiment, the user agent 104 is communicatively interfaced with the VPN client 106 such that the user agent 104 may detect the functional status (i.e., operational, non-operational) of the VPN client 106 and the VPN gateway 112. Both the user agent 104 and the VPN client 106 can be created using any number of programming languages including Practical Extraction and Report Language (PERL), JAVASCRIPT™, Extensible Markup Language (XML), PYTHON™, or RUBY™. However, it should be appreciated that essentially any programming language can be used to create a user agent 104 or VPN client 106 as long as the language can effectuate the required functions of those software objects.

As depicted, when a remote client 102 communicates with an external message server 110, the client 102 may choose to use one of two alternative types of communications connections; an unrestricted communication connection 103 or a virtual private network (VPN) connection 101. As used herein, an unrestricted communication connection 103 is a communications connection between the remote client 102 and external message server 110 that bypasses inspection by the protocol inspection gateway 114. Generally, when a remote client communicates over an unrestricted communication connection 103 the client 102 is unprotected from various types of malicious network attacks (e.g., cross-site scripting attacks, computer viruses, unauthorized user access, denial of service attacks, etc.) that may be initiated by other computers on the network or the external message server 110.

In one embodiment, the unrestricted communications connection 103 linking the remote client 102 and the external message server 110 is through a publicly accessible wide area network (WAN) connection such as the Internet 111. In another embodiment, the unrestricted connection 103 linking the remote client 102 and the external message server 110 is through an local area network (LAN) connection. It should be appreciated that the unrestricted connection 103 can be through any type of network or combination of network types as long as the connection bypasses inspection by the protocol inspection gateway 114 and may be utilized to transmit data (e.g., messages, files, etc.) between the remote client 102 and the external message server 110.

Continuing with FIG. 1, the user agent 104 is configured to monitor and control any unrestricted communication connection 103 established between the remote client 102 and an external message server 110. When the user agent 104 determines that the unrestricted communications connection 103 is with an external message server 110 that matches a restricted server attribute, the user agent 104 is configured to block continued transmission of messages between the remote client 102 and external message server 110 over the unrestricted communications connection 103. In one embodiment, the restricted server attribute is based on the message server type. For example, IM servers (e.g., AMERICAN ONLINE INSTANT MESSAGING™ SERVER, YAHOO INSTANT MESSAGING™ SERVER, MICROSOFT NETWORK INSTANT MESSAGING™ SERVER, etc.), peer-to-peer message (P2P) servers (e.g., BITTORRENT™, etc.), interactive game servers, and other types of file sharing servers. In another embodiment, the restricted server attribute is based on the IP address of the external message sever 110. For example, message servers with IP addresses that match one of a previously compiled list of IP addresses of suspect message servers. In still another embodiment, the restricted server attribute is based on the Open System Interconnection (OSI) layer that the external message server 110 is using to communicate with the remote client 104. It should be understood, however, that the restricted server attributes discussed above are presented for illustrative purposes only and are not intended to be limiting. Essentially any attribute of an external message server 110 can be used as a restricted server attribute as long as the attribute may be monitored and recognized by the user agent 104.

The restricted server attributes are stored in a system configuration file that is configured to be fully updatable. In one embodiment, the system configuration file is stored within the user agent 104. In another embodiment, the system configuration file is stored on a separate and independent memory space (e.g., hard drive partition, etc.) on the remote client 102. It should be appreciated, however, that the system configuration file may be stored in any location or form (e.g., read-writable compact disk, random access memory, tape media, etc.) as long as the user agent 104 can access the restricted server attributes while monitoring the unrestricted communication connection 103 and the file may be updated.

The system configuration file may be updated manually (i.e., by a user of the remote client 102 or a system administrator using the system administration console 118) or automatically by the user agent 104 through some triggering event. In one embodiment, the user agent 104 updates the system configuration file with restricted server attributes from a master configuration file stored on the system administrator console 118 whenever the agent 104 detects any unauthorized attempts (i.e., tampering) to modify the system configuration file. In another embodiment, the user agent 104 updates the system configuration file with restricted server attributes from a master configuration file stored on the system administrator console 118 whenever the remote client 104 accesses the enterprise network 106. In still another embodiment, the system configuration file is automatically updated by the user agent 104 using the master configuration file stored on the system administrator console 118 in accordance with a set interval schedule (e.g., time, etc.).

Still with FIG. 1, when the user agent 102 blocks data communications through the unsecured communications connection 103, the remote client 103 is left with only the option of communicating with the external message server 110 over the VPN connection 101. A VPN connection 101 is established whenever the remote client's 104 VPN client 106 successfully negotiates a communications connection with the VPN gateway 112 via communications tunneling. In this fashion, the VPN client 106 acts as a defacto communications proxy for the remote client 102. As described above, tunneling involves encapsulating the private network data and protocol information exchanged between the VPN client 106 and VPN gateway 112 within the public network protocol data so that the tunneled data is not available to anyone examining the transmitted data frames.

The VPN gateway 112 is configured the authenticate the VPN client 106 prior to availing itself to communications with the VPN client 106. In one embodiment, the VPN client 106 is authenticated based on client credentials (i.e., information provided by remote client 102) relating to a distinguishing characteristic of the authorized user of the VPN client 106 (e.g., biometric information, device configuration, etc.). In another embodiment, authentication is based on something that only the authorized user of the VPN client 106 possesses (e.g., Smartcard, security token, software token, etc.). In still another embodiment, authentication is based on something that only the authorized user of the VPN client 106 knows (e.g., a password, a pass phrase, personal identification number, keystroke sequence, etc.), or some combination of the three. It should be understood that the examples of client credentials depicted herein are used for illustration purposes only and are not meant to limit the types of information that the client credentials may be based on.

All communications (e.g., messages, files, etc.) that are transacted between a remote client 102 and an external message server over a VPN connection 101 are first intercepted by a protocol inspection gateway 114 that is coupled to the enterprise network 116. The protocol inspection gateway 114 is configured to apply policy rules to select types of messages that are exchanged between the remote client 104 and the external message server 110 over the VPN connection 101. For example, the protocol inspection gateway 114 is configured to recognize messages using certain targeted protocols (i.e., IM protocols, peer-to-peer message protocols, etc.) and apply certain policy rules to them. Each targeted protocol is associated with a specific policy rule that includes specific policy enforcement actions to take with regards to the intercepted message using the targeted protocol. In one embodiment, the policy enforcement action involves terminating the connection associated with the message. In another embodiment, the enforcement policy involves recording certain information associated with the message. In still another embodiment, the policy enforcement involves logging information associated with the intercepted message and any related messages. It should be appreciated, however, that the policy enforcement actions may take any form as long as the action can be executed using the protocol inspection gateway 114 and does not compromise the integrity of the enterprise network 116.

Remaining with FIG. 1, in one embodiment, the protocol inspection gateway 114 includes a logging module that can be configured to provide the capability for logging messages as they are intercepted by the gateway 114. In other words, the logging module provides a capability for maintaining a persistent log of all messages exchanged across the protocol inspection gateway 114. Using the database, custom searches can be conducted and reports generated.

As discussed above, the protocol inspection gateway 114 is configured to apply certain policy rules to intercepted messages using certain target protocols. The protocol inspection gateway 114 monitors and applies policy rules to message traffic through the use of a set of enforcement rules that are based on a set of protocol definition files. Each protocol definition file can define a pattern of values associated with a message that uses a target protocol. Examples of these patterns include communications port values and certain character strings on the message header. Thus, the protocol inspection gateway 114 is configured to match the pattern of values of a monitored message with the pattern of values in a protocol definition file to identify messages that use a particular targeted protocol.

There can be an individual protocol definition file for every class or subtype of target protocol. Each protocol definition file is associated with a particular policy rule or set of policy rules. Moreover, the set of enforcement rules and protocol definition files can be expanded as necessary in response to different target protocols and different ways for handling target protocols. The set of enforcement rules and protocol definition files may be updated using the system administrator console 118 that is communicatively linked to the protocol inspection gateway 114. In one embodiment, the system administrator console 118 is configured to allow only an authorized network administrator to add, modify, or change the set of enforcement rules and protocol definition files. For further explanation of how the protocol inspection gateway functions see U.S. patent application Ser. No. 10/167,228, entitled "Extensible Gateway for Protection against Rogue Protocols," filed Jun. 10, 2002, U.S. patent application Ser. No. 10/459,408, entitled "Extendible Gateway for Protection Against Rogue Protocols," filed Jun. 10, 2003, and U.S. patent application Ser. No. 10/459,111, entitled "Extendible Gateway for Protection Against Rogue Protocols," filed Jun. 10, 2003, which are incorporated herein by reference.

Figure 2:
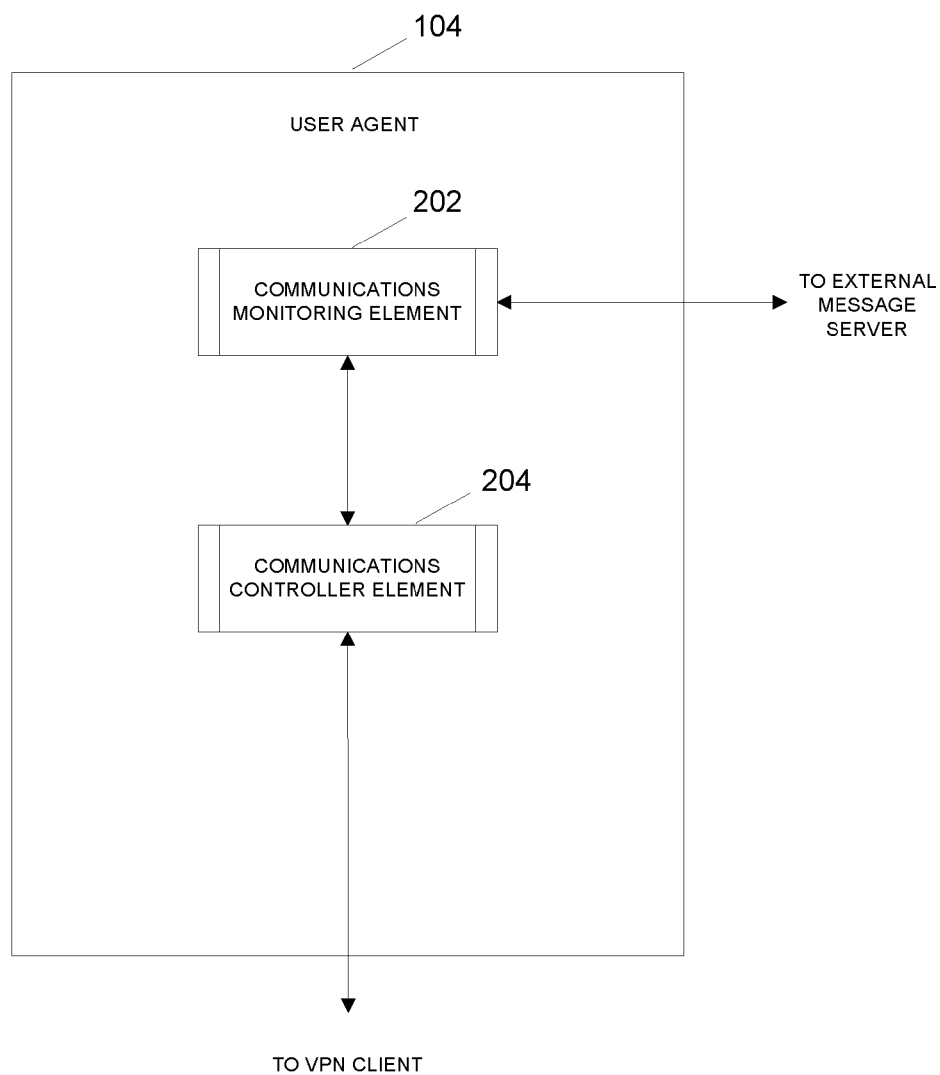
FIG. 2 is a detailed illustration of the functional elements of a user agent, in accordance with one embodiment.

FIG. 2 is a detailed illustration of the functional elements of a user agent, in accordance with one embodiment. As depicted herein, the user agent 104 includes two distinct functional elements: a communications monitoring element 202 and a communications controller element 204. It should be appreciated that both elements are depicted here as separate and distinct entities for the purpose of abstracting the functionality of the user agent 104 without intent to limit the number or types of functional elements that comprise a user agent 104. The communications monitoring element 202 is configured to monitor all communications connections established by the remote client with an external message server to determine if the external message server matches a restricted server attribute in the same fashion as that described above. If a match occurs, the communications monitoring element 202 alerts the communications controller element 204. If a match does not occur, the communications monitoring element allows the communications between the remote client and external message server to proceed unhindered. As discussed above, the restricted server attributes utilized by the communications monitoring element 202 may be updated with the restricted server attributes from a master configuration file stored on the system administrator console 118 in accordance with certain triggering events.

In one embodiment, the communications controller element 204 is configured to block all further communications between the remote client and the external message server unless the communication is first routed through and intercepted by a protocol inspector gateway (by way of a VPN network connection). In another embodiment, the communications controller element 204 is configured to automatically establish a VPN network connection with an enterprise network hosting a protocol inspection gateway and route all communications traffic between the remote client and external message server through the VPN network connection.

Figure 3:
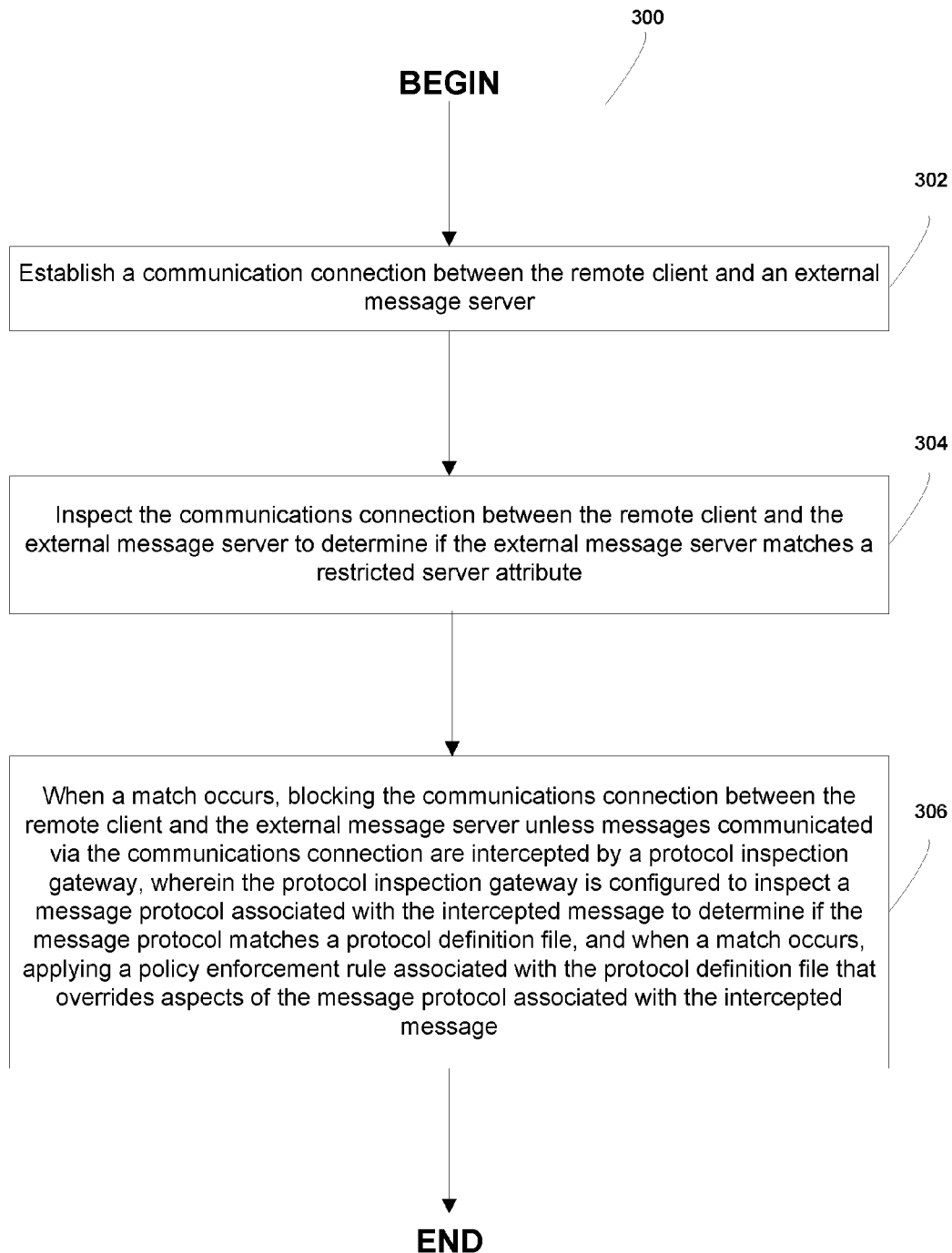
FIG. 3 is a flow chart of a method for enforcing message protocol policy for a remote client, in accordance with one embodiment.

FIG. 3 is a flow chart of a method for enforcing message protocol policy for a remote client, in accordance with one embodiment. Illustrations depicting the system and user agent utilized in this method are shown in FIGS. 1 and 2, respectively. Method 300 begins with operation 302 where a communications connection between a remote client and an external message server has been established. As discussed above, the connection may either be an unsecured communications connection or a VPN connection. The method 300 continues to operation 304 where the communications connection between the remote client and the external message server is inspected to determine if the external message server matches a restricted server attribute. As discussed above, examples of restricted server attributes may include but is not limited to certain message server types such as IM servers (e.g., AMERICAN ONLINE INSTANT MESSAGING™ SERVER, YAHOO INSTANT MESSAGING™ SERVER, MICROSOFT NETWORK INSTANT MESSAGING™ SERVER, etc.), peer-to-peer message (P2P) servers (e.g., BITTORRENT™, etc.), interactive game servers, and other types of file sharing servers.

The method 300 proceeds to operation 306 where, when a match occurs, the communications connection between the remote client and the external message server is blocked unless the messages are intercepted by a protocol inspection gateway. The protocol inspection gateway is configured to inspect a message protocol associated with the intercepted message and determine if the message protocol matches a protocol definition file, and when a match occurs, apply a policy enforcement rule associated with the protocol definition file that overrides aspects of the message protocol associated with the intercepted message.

The embodiments, described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The systems and methods described herein can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

The invention claimed is:

1. A system configured to enforce message protocol policy, the system comprising:
   a virtual private network agent residing within a remote client;
   a user agent residing within the remote client, the user agent comprising,
   a communications monitoring element executing on a computing device and configured to examine a communications connection between the remote client and an external message server to determine if an attribute of the external message server matches a restricted server attribute, wherein both the remote client and the external message server reside outside an enterprise network comprising a virtual private network gateway and a protocol inspection gateway; and
   a communications controller element configured to work in conjunction with the communications monitoring element to,
   block instant message communications between the remote client and the external message server when the attribute of the external message server matches the restricted server attribute unless the instant message communications between the remote client and the external message server and route the blocked instant message communications via the virtual private network agent to the enterprise network, and
   allow direct communication between the remote client and the external message server by bypassing the virtual private network agent when the attribute of the external message server does not match the restricted server attribute;
   wherein the virtual private network gateway is configured to communicate with the virtual private network agent to receive the instant message communications routed thereto, wherein the virtual private network gateway is further configured to receive the routed instant message communications from the virtual private network agent via tunneling,
   and wherein the protocol inspection gateway is configured to,
   receive the instant message communications from the virtual private network gateway routed to the enterprise network,
   inspect a message protocol associated with the routed instant message communications to determine if the message protocol matches a protocol definition file, and
   when a match occurs, apply applying a policy enforcement rule associated with the protocol definition file that overrides aspects of the message protocol associated with the routed instant message communications.

2. The system as recited in claim 1, wherein the restricted server attribute comprises one or more internet protocol (IP) addresses of one or more instant messaging servers.

3. The system recited in claim 1, wherein applying the policy enforcement rule comprises terminating a communication connection associated with the routed instant message communications.

4. The system recited in claim 1, wherein applying the policy enforcement rule comprises recording information associated with the routed instant message communications.

5. The system recited in claim 1, wherein applying the policy enforcement rule comprises creating a log comprising information associated with the routed instant message communications and any related communications.

6. A system for enforcing message protocol policy for a remote client, the system comprising:
   a virtual private network agent residing within a remote client, the virtual private network agent configured to function as a communications proxy for the remote client;
   a user agent executing on a computing device and residing within the remote client, the user agent configured to examine every communications connection established between the remote client and an external message server to determine whether an attribute of the external message server matches a restricted server attribute, and the user agent being further configured to,
   when a match occurs, route to the virtual private network agent instant messages to be transmitted between the remote client and the external message server, and when a match does not occur, allow direct communication between the remote client and the external message server by bypassing the virtual private network agent; and an enterprise network communicatively connected to the remote client and the external message server, wherein both the remote client and the external message server reside outside the enterprise network, the enterprise network including, a virtual private network gateway configured to communicate with the virtual private network agent to receive the instant messages routed thereto, wherein the virtual private network gateway is further configured to receive the routed instant messages from the virtual private network agent via tunneling; and a protocol inspection gateway communicatively connected to the virtual private network gateway and the external message server, the protocol inspection gateway configured to, receive the instant messages from the virtual private network gateway, inspect a message protocol associated with each received instant message to determine if the message protocol matches a protocol definition file, and when a match occurs, apply a policy enforcement rule associated with the protocol definition file that overrides aspects of the message protocol associated with the received instant message.

7. The system of claim 6, wherein the restricted server attribute comprises one or more internet protocol (IP) addresses of one or more instant messaging servers.

8. The system of claim 6, wherein applying the policy enforcement rule comprises terminating a communication connection associated with the received instant messages.

9. The system of claim 6, wherein applying the policy enforcement rule comprises recording information associated with the received instant messages.

10. The system of claim 6, wherein applying the policy enforcement rule comprises creating a log comprising information associated with the intercepted instant messages and any related messages.

11. The system of claim 6, wherein at least one of the remote client and the external message server is communicatively coupled to the enterprise network via a public internet.

12. The system of claim 6, wherein the virtual private network agent and the virtual private network gateway comprise a virtual private network.

13. The system of claim 6, wherein functionalities of the virtual private network gateway and the protocol inspection gateway are integrated into one network gateway device.

14. A method for enforcing message protocol policy for a remote client, the method comprising:

establishing a communication connection between a remote client and an external message server, wherein both the remote client and the external message server are located outside an enterprise network;

inspecting, with a user agent executing on a computing device of the remote client, the communications connection between the remote client and the external message server to determine if a selected attribute of the external message server matches a restricted server attribute;

when a match occurs, (i) blocking instant messages to be sent via the communications connection between the remote client and the external message server (ii) fill routing the blocked instant messages with a virtual private network agent of the remote client to a virtual private network gateway via tunneling, and (iii) communicating the routed instant messages from the virtual private network gateway to a protocol inspection gateway within the enterprise network, wherein the protocol inspection gateway is configured to, inspect a message protocol associated with the routed instant message to determine if the message protocol matches a protocol definition file, and when a match occurs, apply a policy enforcement rule associated with the protocol definition file that overrides aspects of the message protocol associated with the routed instant message, and when a match does not occur between the selected attribute of the external message server and the restricted server attribute, allowing direct communication between the remote client and the external message server by bypassing the virtual private network agent and the virtual private network gateway.

15. The method of claim 14, wherein the restricted server attribute comprises one or more internet protocol (IP) addresses of one or more instant messaging servers.

16. The method of claim 14, wherein applying the policy enforcement rule comprises terminating a communication connection associated with the routed instant messages.

17. The method of claim 14, wherein applying the policy enforcement rule comprises recording information associated with the routed instant messages.

18. The method of claim 14, wherein applying the policy enforcement rule comprises creating a log comprising information associated with the routed instant messages and any related messages.

19. The user agent of claim 1, wherein the restricted server attribute comprises a message server type.

20. The user agent of claim 1, further comprising a system configuration file for identifying one or more restricted server attributes.

21. The user agent of claim 20, wherein the system configuration file is stored on the remote client.

22. The user agent of claim 1, wherein the communications monitoring element is configured to receive the restricted server attribute from a computing device on the enterprise network.

23. The system of claim 6, wherein the direct communication between the remote client and the external message server comprises an unsecured communications connection.

24. The method of claim 14, additionally comprising maintaining a list on the remote client of one or more restricted server attributes.

25. The method of claim 24, additionally comprising updating the list when the remote client accesses the enterprise network.

* * * * *